United States Patent [19]

Oakley et al.

[11] 3,717,350

[45] Feb. 20, 1973

[54] CUEING MEANS FOR RECORD PLAYER

[75] Inventors: Charles F. Oakley; Larry D. Marks, both of St. Joseph, Mich.

[73] Assignee: V-M Corporation, Benton Harbor, Mich.

[22] Filed: June 7, 1971

[21] Appl. No.: 150,400

[52] U.S. Cl. ................................274/23 R, 274/14 R

[51] Int. Cl. ................................................G11b 3/10

[58] Field of Search..................274/10 R, 14 R, 23 R

[56] References Cited

UNITED STATES PATENTS 3,167,317 1/1965 Wilson...............................274/23 R

FOREIGN PATENTS OR APPLICATIONS 1,239,492 4/1967 Germany...........................274/23 R

*Primary Examiner*—Harry N. Haroian

*Attorney*—Johnson, Dienner, Emrich, Verbeck and Wagner

[57] ABSTRACT

A cueing mechanism for raising and lowering a record player tone arm relative to a rotatable turntable independent of manual or automatic record changer means. The cueing mechanism includes a tone arm lift pin and a pair of actuating plates movable through a cue lever to raise and lower the lift plate. Dampening means provide smooth controlled movement of the lift pin, and override means interconnect the actuating plates in a manner to allow movement therebetween to avoid injury to the mechanism if the lift pin is prevented from upward movement or is forced downwardly by the tone arm.

12 Claims, 6 Drawing Figures

Inventors
Charles F. Oakley
and Larry D. Marks.
By Johnson, Dienner, Emrich, Verbeck & Wagner
Attys.

Inventors
Charles F. Oakley
and Larry D. Marks
By Johnson, Dienner, Emrich, Verbeck & Wagner Attys Inventors
Charles F. Oakley
and Larry D. Marks
By Johnson, Dienner, Emrich, Verbeck & Wagner Attys.

CUEING MEANS FOR RECORD PLAYER

BACKGROUND OF THE INVENTION

The present invention relates generally to record players, and more particularly to novel cueing means for effecting raising and lowering of a tone arm independently of manual or automatic record change mechanisms.

It is known to provide a record player having a rotatable turntable and a movable pick-up or tone arm with mechanism for automatically lowering the tone arm to a position wherein its associated stylus is received within the starting groove of a record disposed on the turntable and raising the tone arm after the record is played. It is also generally known to provide such a record player with cueing means whereby the tone arm may be selectively raised from the record when disposed at a position intermediate the beginning and end of play of the record, and thereafter lowered into the same groove of the record for completion of play of the record. An example of cueing means operative to raise and lower a pick-up arm independently of the record change mechanism is disclosed in U. S. Pat. No. 3,534,967 to Gerald H. Freier, dated Oct. 20, 1970, and assigned to the assignee of the present invention. The present invention differs from the mechanism of the reference Freier patent through the provision of novel features which combine to present an improved compact cueing mechanism adapted to selectively raise and lower a tone arm independently of the record change mechanism.

SUMMARY OF THE INVENTION

One of the primary objects of the present invention is to provide a novel compact cueing mechanism operative to raise and lower the pick-up or tone arm of a record player independently of any record change mechanism associated with the record player.

Another object of the present invention is to provide novel cueing mechanism means including override means operative to allow movement of actuating members without injury to the mechanism when the tone arm is prevented from upward movement or is forced downwardly against the direction intended to be imparted to the tone arm by the cueing mechanism.

Another object of the present invention is to provide cueing mechanism means for a record player wherein the actuating plate members are cooperable with a cue lever and a tone arm lift pin to selectively raise and lower the tone arm, and wherein the override means comprise resilient spring means which override the direction of movement intended to be imparted to the lift pin by the cue lever should the tone arm be prevented from upward movement or forced downwardly from its raised position.

A feature of the present invention is the provision of adjustment means for the resilient override means whereby to selectively vary the force at which the override means will release the actuating plate members against the biasing action of the cue lever.

Another feature of the present invention is the provision of adjustable means to limit the extent of upward movement of the tone arm when raised from a lowered position in contact with a record on the turntable to a position above the turntable through actuation of the cueing lever.

Still another feature of the present invention is the provision of over-center cue lever means operative to maintain the actuating plate members in positions biasing the lift pin upwardly notwithstanding that the tone arm may be temporarily restricted or prevented from upward movement.

An important feature of the invention is that raising and lowering of the lift pin, and thereby the tone arm, is initiatable by an externally located, manually operable cue lever. However, the rate at which the tone arm raises off the record or lowers thereto is independent of the rate of movement of said lever. This obtains by reason of a novel construction of actuating plate members through which the cue lever acts on the lift pin, the rate of movement of the tone arm lift pin once initiated being a function of the viscous lubricant about the lift pin which acts as a dashpot to dampen the response thereof to the actuating lever.

Thus a corollary feature of the present invention is the provision of viscous dampening means disposed about the lift pin and operative to establish gradual smooth motion of the lift pin during both upward and downward movement thereof.

In carrying out the objects and advantages of the present invention, there is provided cue mechanism means including a lift pin mounted for vertical movement with its upper end engageable with the pick-up or tone arm of a record player such that selective vertical movement of the lift pin effects a corresponding raising and lowering of the tone arm. A compression spring biases the lift pin to a lowered position and viscous dampening is provided about the lift pin to effect gradual smooth longitudinal movement thereof. A pair of actuating plate members are operatively connected and rockable to urge the lift pin upwardly, the actuating plates being normally disposed in substantially lengthwise side-by-side abutting relation with one of the plates engageable with the lower end of the lift pin and the other plate engageable by a cue lever operable to effect movement of the actuating plates. Override means including an adjustable compression spring interconnect the actuating plates such that initial movement of the plates when engaged by the cue lever separates the plates against the force of the override spring. The override spring thereafter biases the actuating plates into lengthwise side-by-side relation to urge the lift pin upwardly. The override spring allows such separation of the actuating plates if the tone arm is prevented from moving upwardly or if the tone arm is forced downwardly against the upward bias of the actuating plates. An override spring support screw is adjustable to limit the extent of upward movement of the tone arm upon movement of the cue lever to a cueing position.

Other objects and advantages of the present invention, together with the organization and manner of operation thereof, may best be understood by reference to the following description of a preferred embodiment of the invention, when taken in conjunction with the accompanying drawings wherein like reference numerals designate like parts throughout the several views.

DESCRIPTION OF A PREFERRED EMBODIMENT

Figures 1, 2, 6:
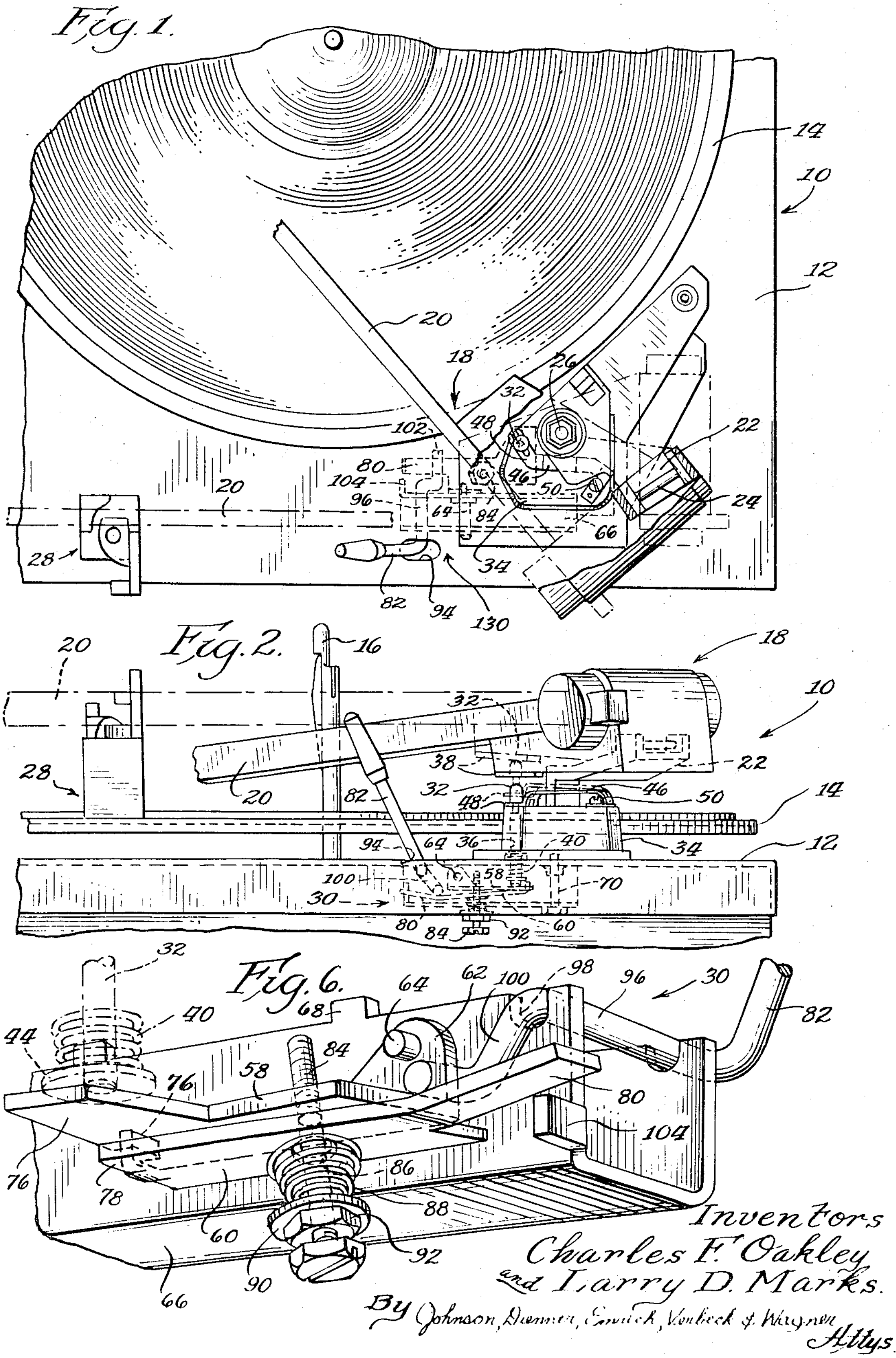
FIG. 1 is a partial plan view of a record player having a cueing mechanism in accordance with the present invention.
FIG. 2 is a partial side elevational view of the record player of FIG. 1.
FIG. 6 is an enlarged perspective view of the actuating plate members and override spring means of the cueing mechanism in accordance with the present invention.

Referring now to the drawings, and in particular to FIGS. 1 and 2, the present invention is shown embodied in a record player of conventional construction which is indicated generally at 10. The record player or changer 10 includes a base plate 12 which serves to support a rotatable turntable 14 adapted to be rotatably driven by suitable turntable drive motor means (not shown) mounted on the underside of the base plate 12 and connected to a suitable source of electric energy. The turntable is rotated about an upstanding center spindle 16 of the type adapted to support a plurality of circular records on the upper portion thereof and effect lowering of the bottom record from the stack to the turntable for rotation therewith.

The base plate 12 further supports pick-up or tone arm means, indicated generally at 18, which includes an elongated tone arm 20 pivotally supported by a hinge member 22 fpr pivotal movement in a vertical plane about a hinge axis 24 and for pivotal or rotational movement in a generally horizontal plane about a vertical axis 26. The pick-up or tone arm 20 supports a suitable stylus on the outer end thereof opposite its pivotal connection to the base plate 12, the stylus being engageable with a record disposed on the turntable 14 as the tone arm 20 is moved from a raised position offset from the turntable, as shown in phantom in FIGS. 1 and 2, to an inward position lowered to the turntable such that the stylus engages the record for playing thereof. Suitable change cycle mechanism (not shown) of conventional construction is utilized for first operating the record lowering means of the center spindle 16 to effect lowering of the bottom record only of the stack of records thereon, then moving the tone arm 20 inwardly from its rest position removed from the turntable to sense the size of the record being lowered, then after the record has been completely lowered to the turntable 14 positioning of the stylus of the tone arm over the starting groove of the record and lowering the tone arm so as to locate the stylus in the starting groove for playing upon rotation of the turntable. The change cycle mechanism is further adapted to raise the tone arm 20 after its stylus has reached the radially innermost run-out groove of the record and move the tone arm to its outer position offset from the turntable preparatory to lowering the next record to the turntable for playing. For purposes of the present invention, the change cycle mechanism may be of any suitable known construction and preferably includes means for raising the tone arm 20 through a change cycle lift pin having its axis coincident with the vertical axis of rotation 26 and further includes means for effecting rotational movement of the hinge member 22 whereby to place the tone arm stylus in position over the starting groove of a record lowered to the turntable for playing. The record change cycle mechanism, per se, forms no part of the present invention and will therefore not be described in greater detail herein. Reference may be had, however, to U. S. Pat. No. 3,533,532 to R. J. Hammond and J. F. Arent, dated Oct. 13, 1970, and assigned to the assignee of the present invention, for an example of suitable change cycle mechanism. Suitable tone arm rest and retention means, indicated generally at 28, may be supported by the base plate 12 offset from the turntable 14 to receive and retain the tone arm 20 during none use of the record player 10.

The present invention relates particularly to cueing mechanism means, indicated generally at 30, for manually moving the pick-up or tone arm 20 between its raised and lowered positions independently of the aforementioned change cycle mechanism. Generally, the cueing mechanism 30 finds application in raising the tone arm 20 from its lowered record playing position to a position raised vertically above the turntable 14 and thereafter manually lowering the tone arm back to a playing position with the stylus being received within the same groove of the record from which it was raised by the cueing means. In this fashion, playing of a record on the turntable 14 may be selectively interrupted by operation of the cueing means 30 and thereafter played to completion from the point at which interruption was effected. Alternatively, the cueing mechanism 30 may be operated to raise the tone arm 20 from a playing position for rotation in a substantially horizontal plane to a different location over the record where it is lowered to play a particular portion of the record. As will become apparent hereinbelow, the cueing mechanism 30 is adapted to effect a dampened raising and lowering of the tone arm 20 so as to preclude damage to a groove in a record when the stylus is raised from and again lowered within a groove in the record.

With reference to FIGS. 3 – 6, the cueing mechanism means 30 includes a pick-up or tone arm lift pin 32 which is supported for longitudinal vertical movement by a housing 34 secured to the upper surface of the base plate 12. The housing 34 may be formed integral with the housing means supporting the hinge member 22 which, as noted, supports the tone arm means 18 above the base plate 12 for vertical and horizontal pivotal movement. The lift pin 32 is slidably received in a vertically disposed bore 36 in the housing 34 such that the upper end of the lift pin underlies a cue plate or engagement plate 38 secured to the underside of the tone arm 20 during the full range of movement of the tone arm 20. With the bore 36 underlying the cue plate 38 during full operational movement of the tone arm 20, upward longitudinal movement of the lift pin 32 is effective to raise the tone arm from its lowered position at substantially any angular position of the tone arm relative to the vertical axis of rotation 26.

Figure 3:
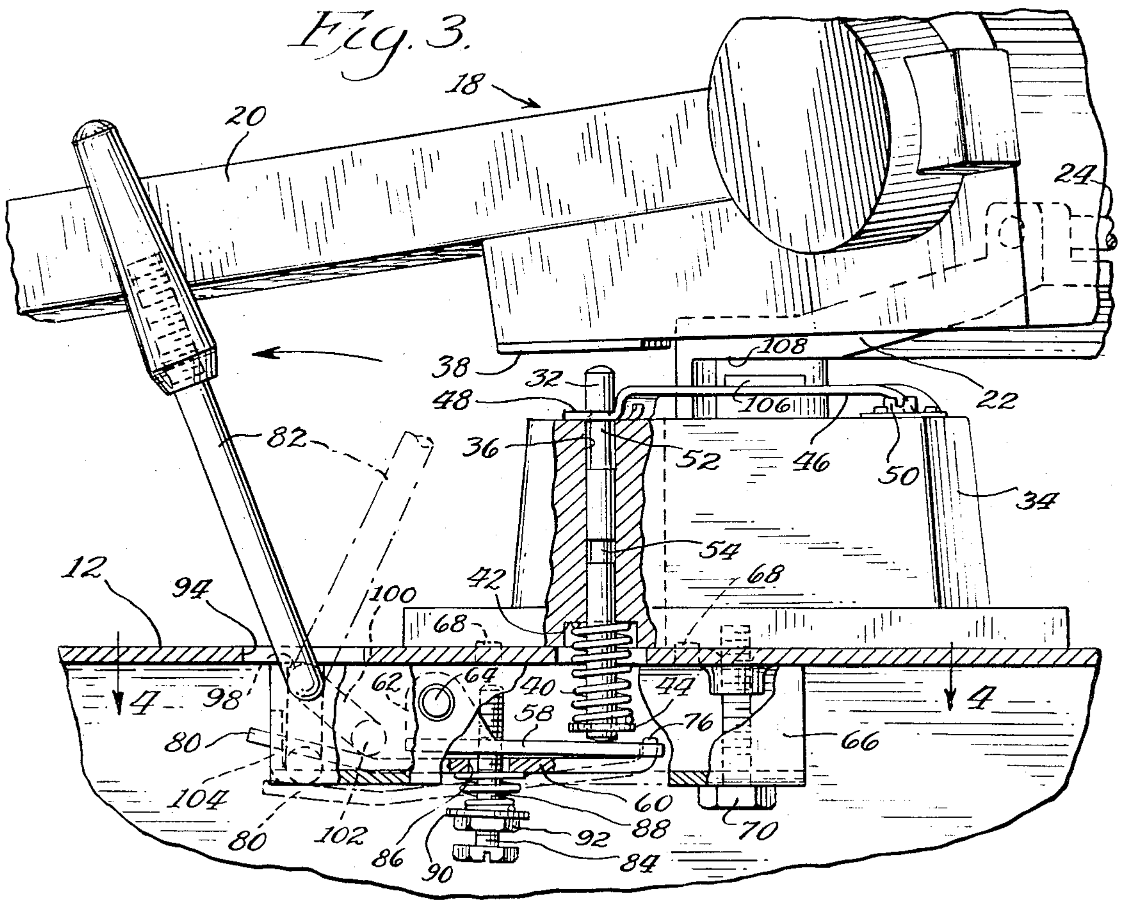
FIG. 3 is an enlarged partial sectional view showing the cueing mechanism elements in their at-rest positions relative to the tone arm.
Figure 4:
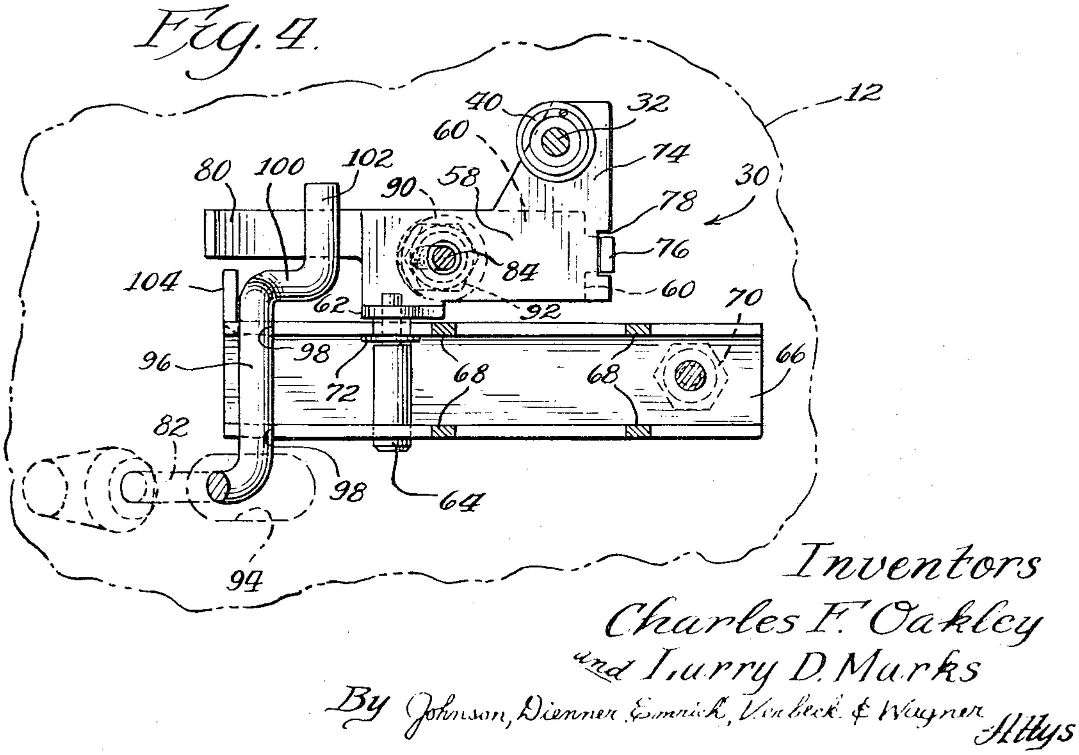
FIG. 4 is a partial horizontal sectional view taken substantially along the line 4—4 of FIG. 3, looking in the direction of the arrows.

The lift pin 32 extends downwardly through the bore 36 in the housing 34 such that the lower end of the lift pin extends below the base plate 12. A coil compression spring 40 is disposed about the lower end of the lift pin 32 and is captured between a recessed shoulder surface 42 in housing 34 and a retainer ring 44 secured on the lift pin 32 adjacent the lower end thereof. The compression spring 40 serves to bias the lift pin 32 longitudinally downwardly within the bore 36 to a position wherein the upper end of the lift pin is spaced below the tone arm 20 when in a lowered record playing position as shown in FIG. 3. Downward longitudinal movement of the lift pin 32 is limited by a resilient clutch arm 46 having a bifurcated end portion 48 which receives a reduced diameter portion 52 of the lift pin 32 between the bifurcated arm portions. The end of the resilient clutch arm 46 opposite the bifurcated end 48 is secured to the upper surface of housing 34 through an attaching screw 50. The bifurcated end portion 48 of the resilient clutch arm engages the upper surface of the housing 34 under the normal downward biasing action of the compression spring 40 on the lift pin 32 such that the lift pin is normally disposed in the position shown in FIG. 3.

The lift pin 32 is longitudinally slidable within the bore 36 and carries a viscous dampening material such as silicone grease or other suitable dampening material in one or more annular chambers such as defined by a reduced diameter lift pin portion 54. The viscous dampening material serves to prevent sudden longitudinal movement of the lift pin and thereby establishes gradual smooth movement of the lift pin when moved between its upper and lower limits of operation.

The cueing mechanism means 30 further includes operating means which is selectively engageable with the lower end of the lift pin 32 and operable to urge the lift pin in an upward direction to raise the tone arm 20 from a lowered recordengaging position to an upward position spaced above the record. The operating means includes a first actuating member or lift plate 58 and a second actuating member or actuator plate 60 cooperable with the lift plate 58 and normally disposed in lengthwise side-by-side relation therewith. The first actuating member or lift plate 58 has an upstanding arm portion 62 which is secured to an end of a pivot pin 64 as by swaging. The pivot pin 64 is pivotally supported by a U-shaped support bracket 66 through suitable aligned pivot pin receiving openings therein. The support bracket 66 has upstanding locating projections 68 thereon which extend upwardly through suitable locating openings in the base plate 12, the support bracket being fixedly secured to the lower surface of the base plate through a mounting bolt 70. The pivot pin 64 is fixed longitudinally through the leg portions of the U-shaped support bracket 66 by a snap ring 72 (FIG. 4) secured on the support pin such that the lift plate 58 may be pivoted in a vertical plane about the axis of pin 64. Noting FIGS. 4 and 6, the lift plate 58 has an outwardly extending arm portion 74 which underlies the lower end of the lift pin 32 and is adapted to engage the lift pin and urge it longitudinally upwardly upon pivotal movement of the lift plate in a clockwise direction about pivot pin 64, as considered in FIG. 6.

As noted above, the actuator plate 60 is normally disposed in lengthwise side-by-side abutting relation with the lift plate 58 and is cooperable therewith to effect upward and downward pivotal movement of the lift plate about its pivot axis 64. To this end, the actuator plate 60 has an upwardly extending arm portion 76 which is received within a suitable locating recess 78 in the lift plate 58. The actuator plate 60 has a rearwardly extending and slightly upwardly inclined portion 80 engageable with a cue lever 82 to be described more fully below. The actuator plate 60 is further cooperably attached to the lift plate 58 through override means which acts to urge the actuator and lift plates into lengthwise abutting relation as illustrated in FIGS. 3 and 6. The override means includes a threaded screw 84 which is received through a suitable threaded aperture in the lift plate 58 such that the screw 84 is disposed in normal relation to the plane of the lift plate. The threaded screw 84 extends through an elongated opening 86 in the actuator plate 60, the opening 86 being large enough to allow separation of the actuator plate 60 from the lift plate 58. An override conical compression spring 88 is disposed about the screw 84 between the lower surface of the actuator plate 60 and a washer 90 which abuts an adjustable nut 92 threadedly supported on the screw 84. The nut 92 is adjustable to vary the compression force of the spring 88 and thereby vary the force acting against the lower surface of the actuator plate 60 to urge the actuator plate into abutting side-by-side relation with the lift plate 58, the cooperating projection 76 in the recess 78 acting as a pivot axis for the actuator plate relative to the lift plate.

The cue lever 82 is operative to engage the rearwardly extending portion 80 of the actuator plate 60 for effecting pivotal movement thereof. The cue lever 82 includes an upper portion extending upwardly through a suitable opening 94 in the base plate 12 for manual movement between first and second operating positions, an intermediate portion 96 cradled in recesses 98 in the upper horizontal edge portions of the U-shaped support bracket 66 to provide a pivot axis for the cue lever, and a downwardly extending portion 100 which is inclined at an angle of approximately 20° from the axis of the upper portion of the cue lever extending above the base plate 12, as considered in FIG. 3. The lower portion 100 of the cue lever terminates in an outwardly directed horizontal portion 102 which overlies the rearwardly extending portion 80 of the actuator plate 60.

Figure 5:
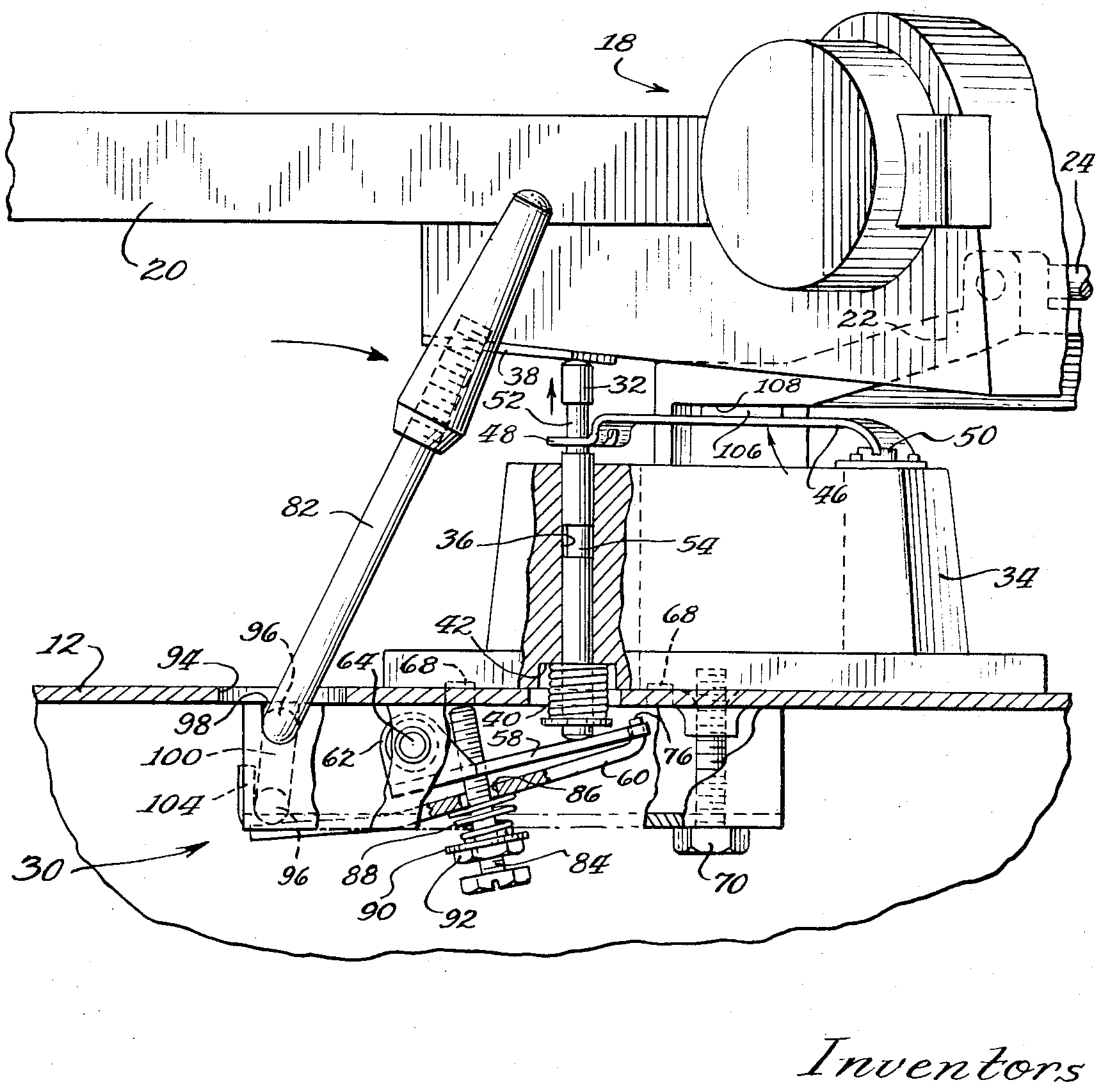
FIG. 5 is an enlarged partial sectional view generally similar to FIG. 3 but showing the cueing mechanism in its operative tone arm lift position.

When in its normal inoperative position, as shown in FIG. 3, the lower portion 102 of the cue lever 82 does not engage the rearwardly extending portion 80 of the actuator plate 60 thereby allowing the compression spring 40 acting on the lift pin 32 to maintain the lift pin in its lowered position. Simultaneously, the override spring 88 urges the actuator plate 60 and lift plate 58 into generally lengthwise abutting relation. When the cue lever 82 is moved to its operative cueing position, as shown in FIG. 5, the lower portion 102 of the cue lever is moved to a position abutting a stop 104 on the bracket 66, the axis of portion 102 passing overcenter through a vertical plane containing the pivotal axis of intermediate portion 96 of the cue lever. In this manner, any force acting upwardly against the lower extension 102 of the cueing lever tends to further pivot the cue lever in a clockwise direction as considered in FIG. 5. In its operating cueing position, the lower extension 102 of the cue lever 82 engages the rearwardly extending portion 80 of the actuating plate 60 and moves it downwardly about the pivot axis established by the projection 76 received in recess 78 in the lift plate 58. Such downward pivotal movement of the actuator plate 60 initially tends to urge the lift plate 58 in a counterclockwise pivotal direction about its pivot axis 64, as considered in FIG. 3, such that the lift engages the lower end of the lift pin 32 and biases it longitudinally upwardly. The force of compression spring 40 and the viscous dampening acting on the lift pin 32 are sufficient to prevent rapid initial upward movement of the lift pin 32 and therefore resist pivotal movement of the lift plate 58. As a result, initial movement of the cueing lever to its cueing position causes the actuator plate 60 to pivot downwardly from the lift plate and compress the override compression spring 88.

As the cue lever is moved to its operative cueing position with simultaneous downward movement of the actuator plate 60 and compression of the override spring 88, the compression force of the override spring continues to bias the actuator plate and lift plate 50 into side-by-side abutting relation whereby to bias the lift plate 58 pivotally upwardly to a position as shown in FIG. 5. The biasing force established by the override spring 88 is sufficient to gradually overcome the downward force of the compression spring 40 and the viscous dampening of lift pin 32 and effect gradual smooth lifting of the tone arm through engagement of the upper end of the lift pin with the cue plate 38. Movement of the cue lever 82 from its operative cueing position back to its inoperative position releases the lower end portion 102 from the actuating plate 60 and allows the actuator plate and lift plate 58 to revert to their side-by-side abutting relation through the action of the override spring 88, with the plates being free to pivot clockwise about the pivot axis 64 as considered in FIG. 3. Release of the lift plate 58 from its upward bias against the lower end of the lift pin 32 allows the compression spring 40 to move the lift pin downwardly to lower the tone arm to a position wherein its stylus is again received within the groove of the record from which the stylus was originally raised. The downward movement of the lift pin 32 is smooth and gradual due to the action of the viscous dampening material on the lift pin.

With the cueing means 30 as described, it can be seen that if the tone arm 20 is in a lowered record engaging position and is maintained in such position by means preventing upward movement thereof, movement of the cue lever 82 to its operative position will effect separation of the actuator plate 60 and lift plate 58 through compression of the override spring 88. However, such movement of the cue lever 82 to its operative position will not be effective to lift the lift pin 32 due to restriction in movement of the tone arm 20. The override spring 88 thus serves to allow breakaway movement of the actuator plate 60 from the lift plate 58 without damaging or applying undue lifting forces to the lift pin 32. The viscous material within bore 36 about lift pin 32, in this situation, acts as a dashpot arrangement such that the rate of movement of the lift pin 32 is independent of the rate of movement of the actuating lever 82.

Conversely, should the cue lever 82 be in it operative cueing position as shown in FIG. 5 with the tone arm 20 raised above the turntable by the lift pin 32, a sudden downward force on the tone arm 20 will move the lift pin 32 longitudinally downwardly and pivot the lift plate 58 in a downward direction about its pivot axis 64. With the lower portion 102 of the cue lever 82 engaging the rearward portion 80 of the actuator plate 60, the actuator plate will be prevented from moving in a corresponding pivotal direction with the lift plate 58. In this instance, the override spring 88 will be compressed to allow separation of the actuator plate 60 and lift plate 58 without damaging the elements of the cue mechanism.

The threaded screw 84 extends upwardly through the lift plate 58 and is longitudinally adjustable relative to the lift plate such that its uppermost end serves to engage the lower surface of the base plate 12 and provide a means for limiting upward pivotal movement of the lift plate upon movement of the cue lever 82 to its operative cueing position as shown in FIG. 5. Limiting upward pivotal movement of the lift plate 58 serves also to limit the extent of upward longitudinal movement of the lift pin 32 whereby to establish the upper limit of movement of the tone arm 20 during a cueing operation.

When the lift pin is moved longitudinally upwardly to cue the tone arm 20 during a cueing operation, the resilient clutch arm 46 is released from engagement with the uppermost end of the lift pin and allowed to seek a normal position as shown in FIG. 5. The resilient clutch arm 46 has a clutch pad 106 secured to the upper surface thereof, the clutch pad serving to frictionally engage a horizontal lower surface portion 108 of the hinge member 22. Engagement of the friction pad 106 with the surface 108 of the hinge member 22 when the tone arm 20 is in its raised cueing position serves to inhibit rotational movement of the tone arm in a horizontal plane about the pivot axis 26 and thereby assists in maintaining the tone arm in a position raised above the exact groove in the record from which the stylus is removed during cueing. The frictional resistance to rotation of the tone arm may be readily manually overcome if it is desired to move the tone arm to a different location over the record being played.

Thus, in accordance with the subject invention, a cueing mechanism 30 is provided which is selectively operable to gradually raise the tone arm 20 from a position engaging a record on the turntable and thereafter effect gradual lowering of the tone arm back to the turntable with the stylus reengaging the record groove from which it was removed during cueing. The cueing mechanism 30 provides a very compact structure which may be readily mounted to the base plate 12 without interfering with any of the conventional record change mechanism. The employment of the lift plate 58 and cooperating actuator plate 60 with the override spring 88 prevents damage to the tone arm or associated components should the tone arm be restricted or prevented from moving upwardly upon movement of the cueing lever 82 to an operative cueing position, or conversely, should the tone arm 20 be suddenly depressed or moved downwardly when the cueing mechanism is in an operative position maintaining the tone arm in its raised position.

While a preferred embodiment of the present invention has been shown and described, it will be obvious to those skilled in the art that changes and modifications may be made therein without departing from the invention in its broader aspects.

We claim:

1. In a record player having a rotatable turntable and a tone arm movable between a position raised above the turntable and a lowered position engageable with a record supported on the turntable, the combination therewith of cueing means for independently moving the tone arm between its raised and lowered positions, said cueing means including first operating means directly engageable with the tone arm and movable to effect movement of the tone arm between its raised and lowered positions, means biasing said first operating means to a position allowing substantially free movement of the tone arm between its said raised and lowered positions, second operating means including first and second actuating members normally disposed in lengthwise abutting relation and each being movable between first and second operating positions to effect movement of said first operating means for raising and lowering the tone arm, said second operating means including resilient means interconnecting said first and second actuating members and biasing them into said normal abutting relation such that movement of said second actuating member to its said second operating position urges said first actuating member to its said second operating position, and manual control means for moving said second actuating member between its said first and second operating positions, said resilient means allowing breakaway of said first and second actuating members upon resistance to movement of said first actuating member when said second actuating member is moved to its said second operating position by said manual control means.

2. The combination of claim 1 including dampening means acting on said first operating means and serving to establish gradual uniform movement of said first operating means in response to movement imparted thereto by said second operating means.

3. The combination of claim 1 wherein said first operating means includes tone arm lift pin means supported for longitudinal movement, and wherein said first actuating member is engageable with said lift pin means and adapted to effect upward longitudinal movement thereof.

4. The combination of claim 3 wherein said biasing means comprises a compression spring operatively associated with said lift pin means and adapted to bias said lift pin means to a position spaced below the tone arm.

5. The combination of claim 1 wherein said first and second actuating members comprise generally rigid pivotally connected members, and wherein said resilient means includes a compression spring supported by said first actuating member and acting on said second actuating member so as to bias said first and second actuating members into lengthwise side-by-side relation.

6. The combination of claim 5 wherein said resilient means interconnecting said first and second actuating members is adapted to allow movement of said first and second actuating members to positions allowing lowering of said lift pin means while said control means is positioned to effect movement of the tone arm to a raised position.

7. The combination of claim 6 including dampening means associated with said lift pin means and adapted to effect gradual uniform movement thereof during raising and lowering of the tone arm by said lift pin means.

8. The combination of claim 7 wherein said dampening means comprising viscous dampening material disposed about said lift pin means.

9. The combination of claim 1 including limiting means associated with said first and second actuating members for limiting the extent of upward movement of said first operating means in a direction to effect raising of the tone arm.

10. The combination of claim 1 wherein said resilient means interconnecting said first and second actuating members includes adjustable means adapted to vary the force biasing said actuating members into said lengthwise abutting relation.

11. The combination of claim 1 including clutch means operatively associated with said first operating means and the tone arm, said clutch means being operative to retard horizontal rotational movement of the tone arm when raised by said cueing means.

12. The combination of claim 1 wherein said manual control means includes a cueing lever movable between overcenter first and second positions, movement of said cueing lever to said second position serving to maintain said second actuating member in a position urging said first actuating member into engagement with said first operating means whereby to urge the tone arm to its raised cueing position.

* * * * *